United States Patent
Tunstall et al.

(10) Patent No.: US 9,946,953 B2
(45) Date of Patent: Apr. 17, 2018

(54) APPARATUS AND METHOD FOR PROCESSING IMAGES OF TISSUE SAMPLES

(71) Applicant: PATHXL LIMITED, Belfast (GB)

(72) Inventors: Jonathon Tunstall, Belfast (GB); Peter Hamilton, Belfast (GB); Yinhai Wang, Belfast (GB); David McCleary, Belfast (GB); James Diamond, Belfast (GB)

(73) Assignee: KONINKLIJKE PHILIPS N.V., Eindhoven (NL)

( * ) Notice: Subject to any disclaimer, the term of this patent is extended or adjusted under 35 U.S.C. 154(b) by 69 days.

(21) Appl. No.: 14/937,559

(22) Filed: Nov. 10, 2015

(65) Prior Publication Data
US 2016/0063724 A1 Mar. 3, 2016

Related U.S. Application Data (63) Continuation-in-part of application No. PCT/GB2014/051426, filed on May 9, 2014.

(30) Foreign Application Priority Data

May 10, 2013 (GB) .................................... 1308460.3
Sep. 23, 2015 (GB) .................................... 1516869.3

(51) Int. Cl.
*G06K 9/00* (2006.01)
*G06K 9/46* (2006.01)
(Continued)

(52) U.S. Cl.
CPC ......... *G06K 9/4652* (2013.01); *G06K 9/4609* (2013.01); *G06T 7/0014* (2013.01);
(Continued)

(58) Field of Classification Search
CPC ........... G06T 2207/30096; G06T 2207/30024
See application file for complete search history.

(56) References Cited

U.S. PATENT DOCUMENTS

2006/0014238 A1 * 1/2006 Gholap .............. G01N 33/5005
435/40.5
2007/0066967 A1 3/2007 Sieckmann et al.
(Continued)

FOREIGN PATENT DOCUMENTS

WO 2004025569 A3 3/2004
WO 2011100261 A3 8/2011
(Continued)

OTHER PUBLICATIONS

Ching-Wei Wang, "Robust automated tumour segmentation on histological and immunohistochemical tissue images", PLoS One, vol. 6, Issue 2, e15818, Feb. 2011, 8 pages.
(Continued)

*Primary Examiner* — Oneal R Mistry (57) ABSTRACT

A computer implemented image processing method is provided for identifying a tissue boundary of a tumor region of a tissue sample, the tissue sample containing non-tumor regions and at least one tumor region. The method includes obtaining an image of a tissue section of the tissue sample, identifying at least one image property of the image, and comparing the image property with classification data. The method further includes, based on the comparison, classifying a region of the image as a tumor region representing a tumor region in the tissue sample or a non-tumor region representing a non-tumor region in the tissue sample. If the region of the image is classified as a tumor region, the method includes identifying a boundary of the region of the image, and using the boundary to identify a tissue boundary of the tumor region of the tissue sample represented by the region of the image.

11 Claims, 5 Drawing Sheets

(51) Int. Cl.
*G06T 7/00* (2017.01)
*G06T 7/12* (2017.01)
*G06T 7/174* (2017.01)
*G06T 7/136* (2017.01)

(52) U.S. Cl.
CPC ............... *G06T 7/12* (2017.01); *G06T 7/136* (2017.01); *G06T 7/174* (2017.01); *G06T 2207/10024* (2013.01); *G06T 2207/10056* (2013.01); *G06T 2207/30024* (2013.01); *G06T 2207/30096* (2013.01)

(56) References Cited

U.S. PATENT DOCUMENTS

| | | | |
|---|---|---|---|
| 2010/0104513 | A1 | 4/2010 | Rittscher et al. |
| 2010/0254589 | A1* | 10/2010 | Gallagher ............ G06K 9/0014 382/133 |
| 2014/0233826 | A1* | 8/2014 | Agaian ................ A61B 5/7267 382/133 |
| 2016/0019695 | A1* | 1/2016 | Chukka ................ G06T 7/0014 382/128 |
| 2016/0042511 | A1* | 2/2016 | Chukka ................ G06T 7/0012 382/133 |

FOREIGN PATENT DOCUMENTS

| | | |
|---|---|---|
| WO | 2012102779 A2 | 8/2012 |
| WO | 2013049153 A3 | 4/2013 |

OTHER PUBLICATIONS

Diamond et al., "The use of morphological characteristics and texture analysis in the identificatioan of tissue composition in prostatic neoplasia", Human Pathology, vol. 35, No. 9, Sep. 2004.
International Search Report for Application No. PCT/GB2014/051426 dated Aug. 20, 2014.

* cited by examiner

APPARATUS AND METHOD FOR PROCESSING IMAGES OF TISSUE SAMPLES

CROSS-REFERENCE TO RELATED APPLICATION

The present application is a continuation in part of International Application No. PCT/GB2014/051426 filed May 9, 2014, which claims priority from UK Application No. GB1308460.3 filed May 10, 2013, all of which are incorporated herein by reference. The present application also claims priority from UK Application No. GB1516869.3 filed Sep. 23, 2015, the disclosure of which is hereby incorporated herein by reference.

TECHNICAL FIELD

The present invention relates to image processing, in particular to systems, methods, apparatus, computer program products and servers for processing an image of a tissue section of a tissue sample.

BACKGROUND

The accurate separation of tumour tissue from non-tumour tissue is a prerequisite for laboratory molecular analysis of many types of tumour tissues.

In standard laboratory practice, tumour tissue for analysis is obtained by cutting a thin tissue section from a formalin fixed, paraffin embedded (FFPE) tissue block known to contain tumour and non-tumour tissue, and preparing the tissue section on a glass histology slide. The tissue section will usually be cut with a thickness of approximately 5 μm or any other appropriate thickness to allow the outline of tissue structures to be made out by viewing the slide under a standard laboratory microscope.

In order to determine a boundary of a tumour region of a tissue section, it has been proposed to prepare a histology slide with the tissue section, comprising staining the tissue section with a laboratory dye and covering with a glass cover slip according to standard laboratory practice, for viewing and analysis by a trained pathologist. A method of marking tumour regions of the tissue section comprises the pathologist viewing the slide using a standard laboratory microscope and, based on subjective assessment, for example based on memory or on visual comparison with a look-up chart, identifying regions of the tissue section appearing to correspond to model tumour structures, and indicating boundaries of the regions via a manual annotation with a marker pen on the glass coverslip. Following annotation, a sequential tissue section, preferably having a thickness in the range indicated above, is cut from the tissue block and prepared on a second histology slide. Using the annotated slide as a template, tissue is manually scraped, using a scalpel, from a region of the sequential tissue section contained within an area corresponding to an annotated region.

The above process is manual in nature and relies upon subjective input from the pathologist to annotate the tumour area. Internal validation studies have indicated a high degree of both intra and inter-pathologist variation in this manual annotation process.

SUMMARY

Aspects and examples of the invention are set out in the claims.

Some aspects of the disclosure provide an automated method for tumour boundary indication which will accurately depict the tumour region for either manual dissection or for dissection using an automated instrument. The present disclosure relates to both of these applications and any other dissection methods which may be envisaged from the use of this technology, whether those be manual, automated or instrument controlled processes.

Some embodiments aim to provide an improved image processing system, apparatus, method, computer program product and server for identifying a boundary of a tumour region of a tissue sample and for making data representing the boundary available to at least one user, and a macrodissection system, method and apparatus for identifying the same and for using data representing the boundary to perform macrodissection.

BRIEF DESCRIPTION OF DRAWINGS

Embodiments of the invention will now be described, by way of example only, with reference to the accompanying drawings in which.

SPECIFIC DESCRIPTION

Figure 1:
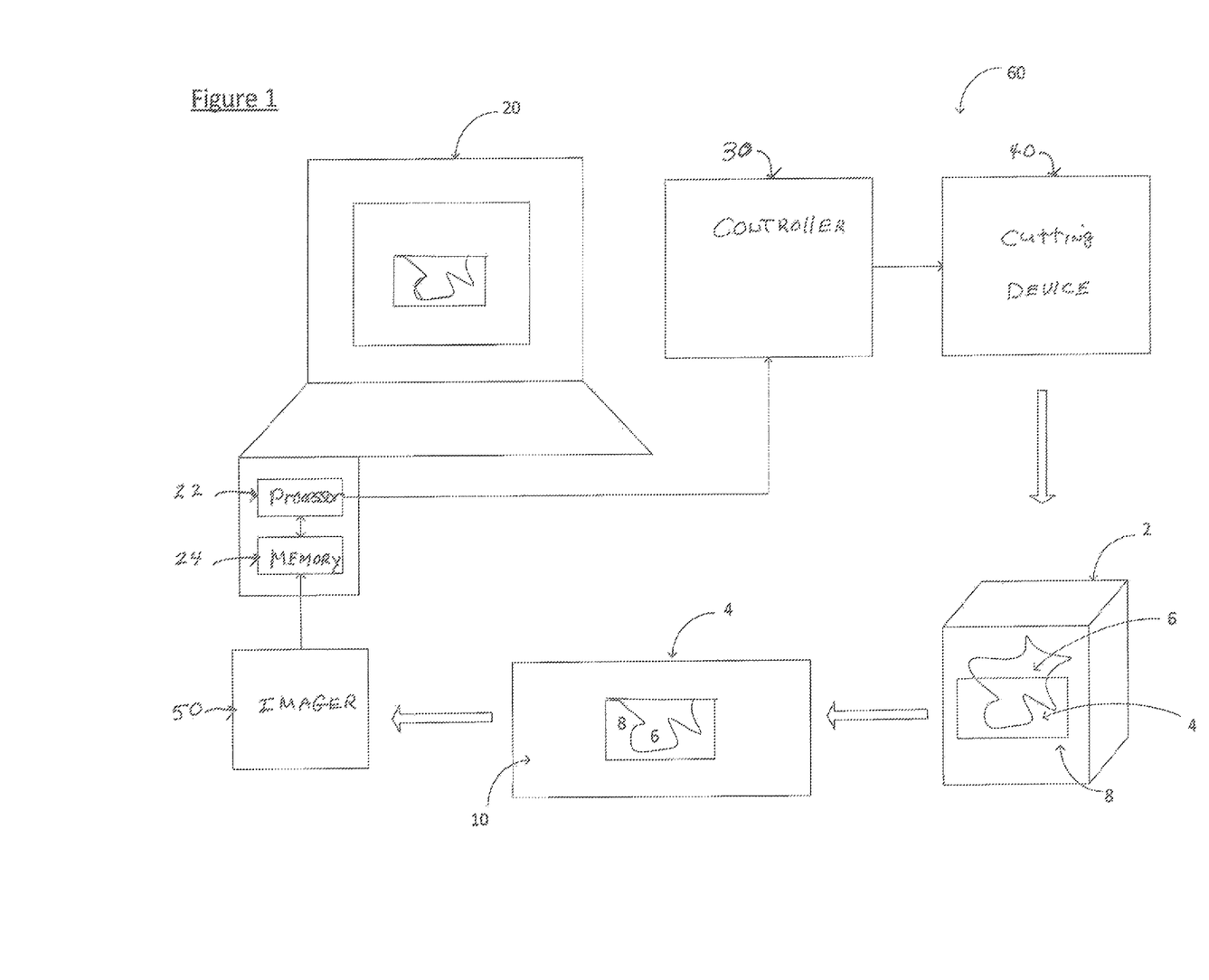
FIG. 1 schematically shows a macrodissection system for excising tumour tissue from a tissue sample.

FIG. 1 shows a macrodissection system 60, comprising a tissue sample 2, a histology slide 10 carrying a tissue section 4 taken from the tissue sample 2, an imager 50, a computer 20, a controller 30, and a cutting device 40. The imager 50 is arranged to obtain a digital image of the tissue section 4 on the histology slide 10 and to provide data representing the image to the computer 20. The computer 20 is configured to receive the data from the imager 50, to run an algorithm on the data to generate a result, and to provide the result to the controller 30. The controller 30 is configured to control a cutting operation of the cutting device 40 based on the result.

The tissue sample 2 comprises tissue block suspected of containing at least one tumour region 6, and containing non-tumour regions 8.

The tissue section 4 is a section cut from the tissue sample 2, having a thickness in the range of approximately 5 μm, or 10 to 40 μm, although the skilled practitioner will understand that another thickness could be chosen as appropriate. A sequential tissue section (not shown) is a further slice cut from the tissue sample 2 at a location exposed by taking the first tissue section 4. The thickness of the sequential tissue section need not be the same as that of the first tissue section.

The histology slide 10 is a standard glass laboratory slide or any suitable equivalent for providing a flat transparent surface for receiving and displaying the tissue section 4.

The imager 50 is configured to generate an image of the tissue section 4 on the histology slide 10 and to provide data representing the image to computer 20.

The computer 20 comprises memory 24 and a processor 22. The memory 24 is configured to receive and store data from the imager 50. The processor 22 is coupled to access image data stored in the memory 24, to implement an image processing algorithm on the data to classify a region of the image as a tumour region and identify a boundary of the region (see, for example, FIG. 3), to output data representing the boundary to the controller 30 and optionally to send a copy of the data to the memory 24 for later use.

Figure 2:
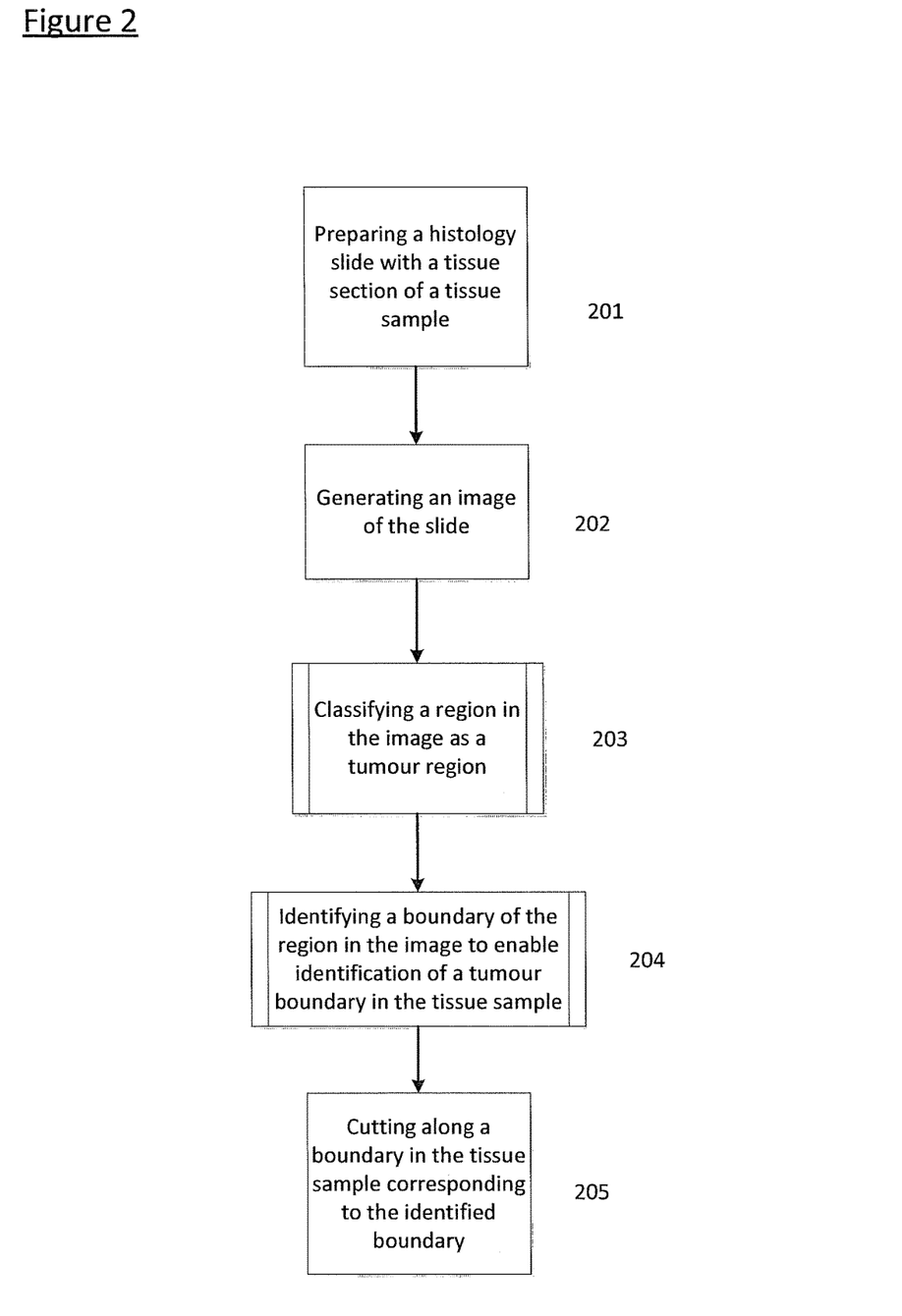
FIG. 2 shows a flow chart illustrating a method of using the macrodissection system of FIG. 1.

FIG. 2 shows a flow chart illustrating a method of operation of the system of FIG. 1.

The histology slide 10 is prepared 201 by cutting the tissue section 4 form the tissue sample 2 using a laboratory microtome. The tissue section 4 is placed in the slide 10, stained with Haematoxylin and Eosin laboratory stain and covered with a glass cover slip.

An image of the tissue section 4 is obtained 202 by imaging the cover slide 10 with the imager 26. Data representing the image is provided to the memory 24 of the computer 20.

The processor 22 retrieves the image data from the memory 24 and analyses the data to classify 203 a region of the image as representing a tumour region of the tissue section. Classifying the region comprises comparing at least one property of the image data with classification data (see, for example FIG. 3).

The processor 22 identifies 204 a boundary of the region to enable identification of a tumour boundary in a sequential tissue section. Data representing the identified boundary is output to the controller 30. The data may be displayed on a user interface.

Data representing the region and the boundary are stored to non-volatile memory for later user reference and/or for updating the classification data using a learning method.

The controller 30 receives the data representing the boundary and guides the cutting device 40 to cut 205 in the sequential tissue section along a path based on the boundary, by using the boundary as a template.

Figure 3:
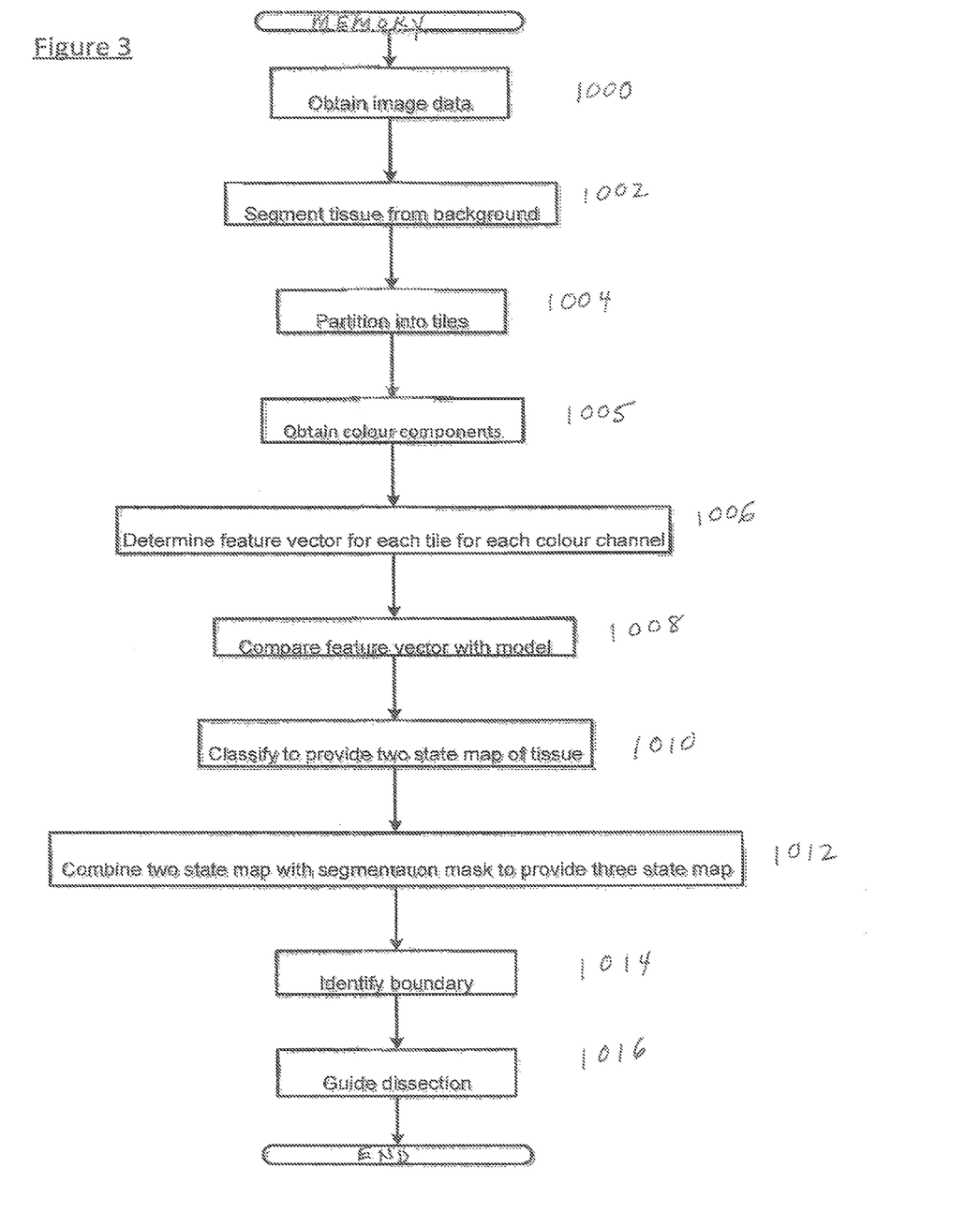
FIG. 3 shows a flow chart illustrating a computer implemented method of processing an image to guide dissection of a tissue sample suspected of comprising tumour tissue.

FIG. 3 shows a flow chart illustrating a computer implemented method of processing an image to guide dissection of a tissue sample suspected of comprising tumour.

The processor 22 obtains 1000 from memory 24 an image of a section through the tissue sample. The section can be imaged from a microscope slide stained using Haemotoxylin and Eosin.

The processor obtains 1001 a first component of the image data corresponding to the Eosin stain.

The processor PPP then selects a threshold to apply to the first component of the image data that divides the eosin image data into two groups. The processor is configured to select a threshold that reduces, for example minimises, the variance of the data values within each group. The processor 1000 then applies the threshold value to the first component of the image data to generate a mask.

The processor then applies the mask generated from the first component to segment 1002 the image data into two groups. Image data in the first group is identified as tissue, and image data in the second group is identified as background.

The processor then partitions 1004 the first group of image data, relating to tissue, into tiles. The image data for each tile comprises image data relating to that tile at a series of different resolutions. The data for the tile at each different resolution comprises a plurality of blocks each representing at least a portion of the tile at a different effective magnification. Different magnifications may be achieved by providing equivalent pixel numbers for different sized spatial regions, or a different number of pixels for equally sized spatial regions.

For each tile, at each resolution level, the processor obtains 1005 three components of the image data, a first component corresponding to the Eosin stain, a second component corresponding to the Haemotoxylin stain, and a third grey scale component. The first and second components may be obtained by applying a colour deconvolution method to the image data. The grey scale image data comprises a greyscale version of the image data in the tile.

For each colour component of the tile, the processor selects at least one property to be determined based on the colour component image data in the tile. The properties to be determined are selected based on the colour component so different properties can be determined for different colour components. The properties are selected from the list comprising texture, statistical moments, such as centroids, averages, variances, higher order moments, moment invariant, frequency domain features, features derived from the grey level co-occurrence matrix, and morphological features, such as average nuclear size and/or shape, nuclear concentration in a spatial region, and high level spatial relationships between image objects, which may be derived from Delaunay Triangulation, Voronoi diagram and/or a minimal expanding tree algorithm which treats each cell nucleus as a vertex.

The processor then determines 1006 the selected image properties for each of the three components of the tile, and concatenates the image properties together to provide a feature vector.

The processor then obtains from memory a subset of the stored classification data. The classification data comprises a first set of model image feature vectors associated with tumour tissues, and a second set of model image feature vectors associated with non-tumour tissue.

The processor selects from amongst the first plurality of feature vectors (tumour type) from the classification data, and the second plurality of feature vectors (non-tumour type) from the classification data to provide a subset (e.g. less than all of the set). This provides a subset of model feature vectors.

The processor then compares 1008 the concatenated feature vector from the tile with the selected subset of the classification data, and based on the comparison, the processor classify 1010 the tile as belonging to one of two states—tumour or non-tumour.

The processor is configured to combine 1012 the tiles to provide a two state map (e.g. binary) identifying tumour, and non-tumour regions of the tissue with the tissue/non-tissue mask generated by the segmentation 1002 to provide a spatial map of the image data which classifies regions of the image into one of three states e.g. background, tumour tissue, and non-tumour tissue.

The processor is further configured to identify 1014 a boundary between regions in the three state map The processor is configured to identify an initial boundary based on an edge detection algorithm, encode the resulting boundary, and smooth the boundary by reducing the contribution of high spatial frequency components to the boundary.

The processor then obtains a probability estimate based on comparing the feature vectors of tiles in tissue regions of the image with the selected subset of model image data to assign a probability to each tile.

The processor then displays the resulting probability estimate as a colour map, overlaid with the smoothed boundary data, to provide a user with an estimate of the location of tumour and non-tumour regions in the image.

It will be appreciated by the skilled addressee in the context of the present disclosure that the disclosure provides systems, methods, apparatus, computer program products and servers for processing an image of a tissue section of a tissue sample to analyse and identify a tumour region of a tissue sample for the purpose of macrodissection of the tissue sample. As already provided, a tumour may contain patterns of cell growth which contain, but are not limited to, any of dysplasia, neoplasia, carcinoma in-situ and cancerous tissue, or any combination thereof. It will be appreciated by the skilled addressee in the context of the present disclosure that the disclosure could equally apply to other diseases which are capable of morphological identification.

In FIG. 1, the computer 20 is represented as a desk-top PC. It will be appreciated that any other type of computer or server could be used.

The processor 22 of FIG. 1 may be a standard computer processor, but it will be understood that the processor could be implemented in hardware, software, film ware or any combination thereof as appropriate for implementing the image processing method described herein.

The memory 24 of the computer 20 of FIG. 1 may be configured to store data received from the imager 50, results generated by the processor 22, and classification data for classifying tumour and non-tumour regions. Non-volatile memory may be provided for storing the classification data. Further non-volatile memory may be provided for storing the image data so that the image data for a plurality of tissue samples may be uploaded and stored in memory until such time as the processor 22 has capability or an instruction to process it. The memory 24 may comprise a buffer or an on-chip cache. Further non-volatile memory may be provided for storing results of the image processing method for later user reference and/or for updating the classification data using a learning method.

The controller 30 is configured to receive the output from the computer 20 and to control the cutting device 40 to cut tissue from a sequential tissue section based on the processor output. The controller 30 comprises any suitable means for guiding a cutting device along a predetermined path. For example, the controller could comprise a processor coupled to a machine driven scalpel or laser. In another example, the controller 30 is configured to provide and/or display a template based on the processor output to guide cutting, for example automated or manual cutting along a path corresponding to a boundary shown on the template or to scrape tissue with a spatula from inside the boundary.

Tumour regions, such as the tumour schematically illustrated by region 6 of FIG. 1, are tissue regions containing abnormal patterns of growth, which may include, but are not limited to, any of dysplasia, neoplasia, carcinoma in-situ and cancerous tissue or any combination thereof. The non-tumour regions 8 may also contain tumour tissue, but in a lower concentration than present in their tumour regions 6, as will be understood by those skilled in the art. The tissue block may be a formalin fixed, paraffin embedded tissue block, or a tissue block prepared in any other suitable way.

The cutting device 40 may be a bladed instrument for cutting in a tissue section. In other examples the device could comprise a laser for dissecting tissue or a blunt instrument, such as a spatula, for scraping tissue from the slide.

The imager 50 may comprise any suitable image generating means, including, but not limited to, an analogue or digital camera and a digital slide scanning system, in which an image is reconstructed following acquisition of image tiles or raster lines.

Obtaining the image data may comprise retrieving it from non-volatile memory, or from RAM, or from an on chip-cache, ADC or buffer. The image data in memory may be derived from data stored elsewhere in the apparatus, or received over a communications link such as a network, or obtained from an imager such as a microscope.

The section of tissue can be stained using Haemotoxylin and Eosin, or with any other appropriate histological stain. The description above makes reference to separating the image data into components corresponding to the particular stains. As will be appreciated, other coloured stains may be used, and the image data may be separated into components corresponding to the stains used. The components may comprise colour channels, which may be separated using a colour deconvolution method. However, other types of colour component, separated by other kinds of methods may also be used.

Obtaining 1001 the first component corresponding to the eosin stain may comprise obtaining the intensity of eosin stain using colour deconvolution method. The second component corresponding to the Haemotoxylin stain may be similarly obtained.

The segmentation by masking may be based on a single component of the image data, such as the first (eosin) component as described above, or from one of the other components, or from the original image data, or from a combination of one or more of these. In some examples a predefined image mask may be used.

The threshold used to provide the mask can also be predefined rather than being based on the variance of the data values within each group. In some possibilities the threshold may be selected based on user input, for example the processor may be configured to determine the threshold (e.g. based on intra-group variances) and then to adjust the threshold based on input from a user.

Segmentation may be performed to provide a mask at each of a plurality of resolution levels, or segmentation may be performed at one resolution (e.g. the native resolution of the images) and then up-sampled or down-sampled (e.g. by smoothing) to provide masks at different resolutions.

The image data for each tile may comprise image data relating to that tile at at least one resolution. Where different resolutions are used these may be provided by images collected at differing levels of magnification, for example as described in relation to FIG. 3. In some possibilities, images at different resolutions for a given tile may be obtained by down-sampling, e.g. smoothing, or by image interpolation. This approach may be used in combination with differing magnification levels.

Image tiles of the same image region having different resolutions described above may comprise the same number of pixels, or a different number of pixels covering the same spatial region of the image. Different classification data may be applied to the image data relating to different resolutions.

In one possibility, for each tile, at each resolution level, the processor obtains 1005 three colour components, one corresponding to an eosin colour channel and another corresponding to a Haemotoxylin colour channel as obtained using a colour decomposition method, as well as one grey scale colour channel obtained directly from the original RGB coloured image. The processor then continues to step 1006 of the method as described above.

At or following the classification step 1010, tiles classified as representing tumour regions may be assigned a posterior probability of corresponding to a tumour region of the tissue sample, based on a selected threshold level. For example, when classifying the tile as tumour or non-tumour, a threshold level of 0.5 (50%) may be applied.

The probability estimate used to generate the colour map be obtained by updating the posterior probability data.

The processor subset of the stored classification data may be selected at random, for example in a Monte-Carlo type approach. In some possibilities, selecting may comprise selecting a predefined, or user selected, subset of classification data. In one possibility the classification data comprises data (e.g. feature vectors) relating to known tissue types and/or known tumour types, and selecting the subset of classification data may comprise selecting classification data based on the tissue type of the sample from which the imaged section of tissue was derived.

The classification data may be derived from a supervised learning model in which the classification data comprises a feature vector derived from an image of a tissue sample, and an indication of whether that feature vector relates to tumour or non-tumour image data. The processor may be configured to obtain input from a user confirming whether a region of the image comprises tumour tissue and to store one or more feature vectors from that region of the image in memory with the classification data. This may enable the operation of the method to be adapted or tuned to operation in particular types of tissue.

The boundary may be encoded in the form of a sequence of transition indicators indicating the direction of a transition between two consecutive boundary pixels, e.g. a step to the right, a step diagonally right and up, a step up etc. Encoding the boundary in this way may provide as many transition indicator elements as there are boundary pixels. The position of the boundary in the image can then be encoded using the coordinates of the first pixel in the sequence. As will be appreciated by the skilled addressee in the context of the present disclosure, any other type of encoding of a line in a 2D plane may be used.

In addition to, or as an alternative to displaying the probability estimate as a colour map, overlaid with the smoothed boundary data, the processor may be configured to control a cutting tool as described above with reference to FIG. 1 and FIG. 2 to dissect the tumour tissue from a sample (e.g. the sample from which the tissue section was derived) based on the boundary. In some examples the functionality of the computer and/or the processor may be provided by digital logic, such as field programmable gate arrays, FPGA, application specific integrated circuits, ASIC, a digital signal processor, DSP, or by software loaded into a programmable processor.

In an aspect there is provided a computer implemented image processing method of identifying a tissue boundary of a first tissue type region of a tissue sample comprising at least one region of a first tissue type, and a second tissue type, to enable excision of at least a portion of the region of the first tissue type from the tissue sample by cutting along the tissue boundary, the method comprising: obtaining an image of a tissue section of the tissue sample; identifying at least one image property of the image; comparing the image property with classification data; based on the comparison, classifying a region of the image as the first tissue type or the first tissue type; and if the region of the image is classified as a first tissue type, identifying a boundary of the first tissue type in the image; using the boundary to identify a region of the first tissue type in the tissue sample.

It will be appreciated in the context of the present disclosure that the methods and apparatus explained herein may find particular utility in the provision of maps of tissue, in which areas in an image of a tissue sample are classified as belonging to particular types of structures or objects. It will also be appreciated that the image data may include a multitude of normal components and/or structures, such as cells, ducts, and/or the like, and a number of non-normal components and/or structures which, for example, may include pre-cancerous and/or cancerous cells. These normal and non-normal components and/or structures may be combined in a range of complex and variable patterns. The image analysis techniques described herein may enable an effective and efficient decombination and un-mixing of such components and/or structures and subsequent analysis thereof. The separation into regions of "tumour" and "non-tumour" may also be applied to identify other structures within the tissue. The analysis of these normal and non-normal components and/or structures allows for a "map" of these regions across the image to be generated. Such a map may enable more accurate and diverse diagnosis and analysis to be carried out, and may allow identification, at-a-glance, of areas of tissue contained within image data which may require further analysis.

Figure 4:
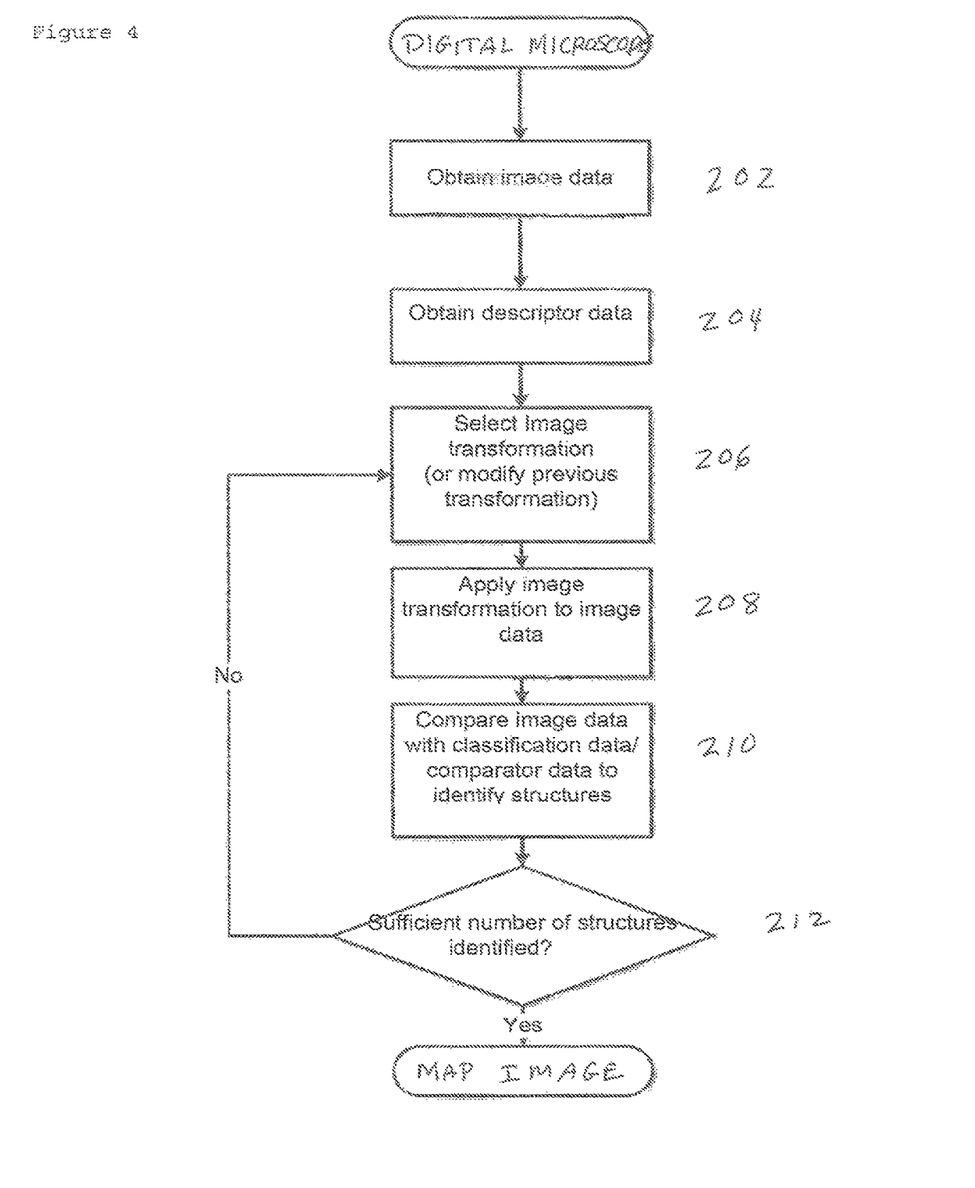
FIG. 4 illustrates a digital image processing method for identifying tissue structures in a microscope image.

FIG. 4 shows further method steps which may be employed to analyse the image data yet further. In this method a first image data set is obtained 202 from a digital microscope image.

An image transformation is then applied 206 to that first image data to obtain second image data. Structures in this second image data are then classified by comparing them with comparator data to identify them as belonging to one of a number of structures known (or expected) to be found within the tissue type.

In the event that unclassified structures remain in the second image data, the image transformation is modified, and applied 208 again to at least the part of the image data which includes the unclassified structures. This provides a third image data set. Structures in this third image data can then be classified by comparing them with the comparator data.

This process of attempted classification followed by modification of the image transform, followed by reattempted classification of the newly transformed (unclassified) image structures can be repeated until all structures in an image (or an acceptable proportion of those structures) have been properly classified.

This approach may be applied alone, in combination, and/or in a hierarchical nature. The further image analysis techniques may be selected based upon the tissue type stored in the descriptor data, and when applied in combination and/or in a hierarchical nature, these further image analysis techniques may be applied in a predetermined order, which may be based upon the tissue type stored in the descriptor data. A hierarchical application of these further image analysis techniques may be applied across images at a number of resolutions.

The computer obtains 202 microscope image data for analysis, and then obtains 204 descriptor data, which may be provided with the microscope image data that indicates a type of tissue from which the tissue sample originates. The memory of the computer comprises an association, such as a look up table, which links a plurality of items of descriptor data to a corresponding plurality of sets of quantitative image metrics. The stored association may also link a plurality of items of descriptor data to a corresponding plurality of image transformations.

Each item of descriptor data comprises a machine readable identifier of a tissue type. The association links each item of descriptor data to a set (or sets) of quantitative image metrics associated with that tissue type. This enables the correct image metrics to be retrieved from memory for the analysis of any given tissue type (as identified by the descriptor data). Each item of descriptor data is also associated with at least one corresponding set of comparator data values, also referred to herein as classification data. Each set of these comparator data values (or classification data) indicate the values of quantitative image metrics obtained from a tissue structure known (or expected) to be found in the type of tissue identified by the corresponding descriptor data. For example, the descriptor data may identify tissue types such as breast tissue, prostate tissue, lung tissue, pancreatic tissue and other types of tissue. It will be appreciated in the context of the present disclosure that each of these tissue types may comprise different types of structures. Accordingly, more than one comparator data set is generally associated with each descriptor. Each of these comparator data sets describes a different tissue structure known (or expected) to exist in that tissue type.

The descriptor data may then be used to select 206 from data storage in the computer memory an image transformation based on the stored association. Examples of such image transformations are set out below. The computer then applies 208 the image transformation to obtain first transformed image data.

The computer then uses the descriptor data to obtain a set of (or sets of) comparator data values (e.g. values of these quantitative image metrics) from the computer memory. The first transformed image data is then compared 210 with this comparator data to identify structures in the first transformed image data. The computer then determines 212 whether a sufficient number of structures have been identified (e.g. whether more than a threshold number, or proportion, of structures remain unidentified). In the event that an insufficient number of structures have been identified, the computer returns to step 206 and either (a) select a new image transformation or (b) modifies the previous transformation. This new transformation is then applied 208 and the steps 210 and 212 can be repeated to determine whether yet a further transformation needs to be applied.

FIG. 4 is an example of a method which can be applied to provide a map of a microscope slide image of a haematoxylin and eosin stained tissue sample. Other examples of such methods may be used.

Such methods include selecting an image operation configured to transform the image data, and then applying the selected image operation to the image data to identify a number of discrete spatial regions of the image. To identify these regions of interest (ROIs) quantitative image metrics (such as any one or more of such metrics described herein) can then be applied to the ROIs. This provides sample region data values for each ROI (discrete spatial region), which can be compared with at least one set of comparator data in an attempt to identify that region.

In the event that the sample region data value matches a comparator set, a next region can be tested by attempting to match it against comparator data. By treating each area of an image in this way a map of the image can be assembled in which each area (or at least a number of areas) of the image are labelled as belonging to a particular tissue structure. This can be used to provide a composite digital image of the tissue.

Figure 5:
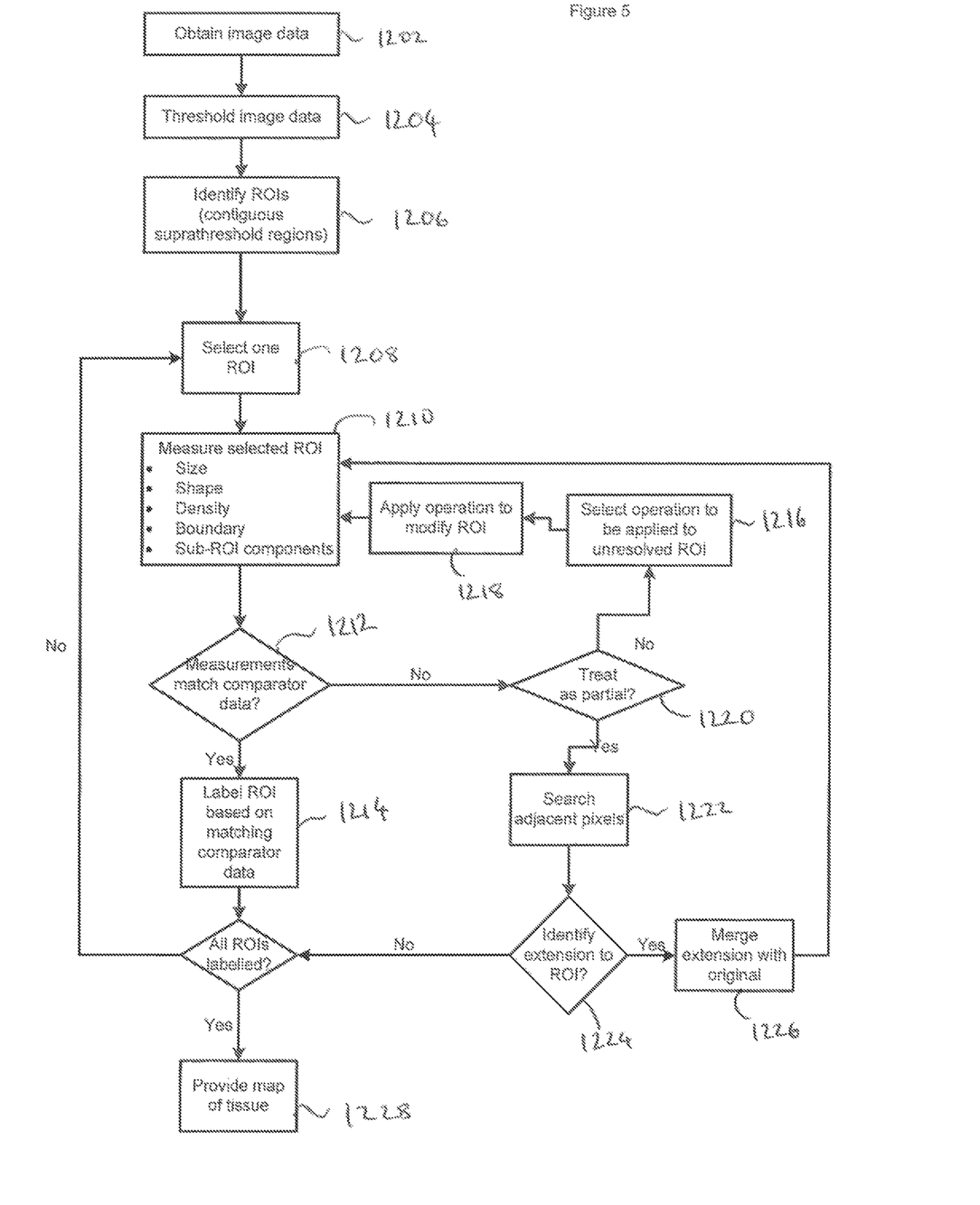
FIG. 5 illustrates another digital image processing method for identifying tissue structures in a microscope image.

FIG. 5 illustrates one example of a computer implemented image processing method such as that described above. This method can be applied to identify a tissue structure known, or expected, to be found in a particular tissue type. For example, if the method is applied to breast tissue it may be used to identify structures such as glands, ducts, lobules, or other structures which are found in such tissue. It may also be applied to other tissue types of course, in which case comparator data for different types of structures may be used.

As illustrated in FIG. 5, the computer obtains 1202 microscope image data for analysis. This microscope image data may be accompanied by descriptor data indicating type of tissue from which the microscope image was obtained. The microscope image data may also comprise data captured from a whole slide scan, for example in a 32 bit colour image. Such image data may be converted to optical density image data before further processing.

The computer then applies 1204 a threshold, for example an optical density threshold, to the image data to obtain first transformed image data. This first transformed image data is transformed by the application of a threshold in the sense that it is a two-state image of foreground (suprathreshold) and background (subthreshold) pixels, for example it may be binary data.

Structures in this first transformed image data are then classified by comparing them with comparator data (e.g. classification data). In this embodiment, to classify the structures (contiguous suprathreshold regions), the computer first identifies 1206 each contiguous group of suprathreshold pixels. This may be done by so called "blob extraction" methods such as connected component labelling. For example the computer may treat each suprathreshold pixel in turn, and for each such pixel identify the neighbours of that pixel which are also suprathreshold and identify (label) these as being part of the same contiguous group as that pixel. This process may be repeated iteratively until each contiguous group of pixels is labelled. These contiguous groups of pixels may each represent a structure (or part of a structure) in the underlying tissue from which the image data was obtained.

Each of these separate regions of interest (ROIs) is then compared with comparator data in an attempt classify that region of the underlying tissue. To perform this classification, a first one of these ROIs is selected 1208, and the computer determines 1210 at least one of the following quantitative image metrics:
    the size of the ROI,
    the shape of the ROI,
    the optical density of the ROI,
    the boundary of the ROI, and
    whether the ROI includes any identifiable sub-ROI components.

The boundary of the ROI may be identified according to any one of the methods described herein.

Other image metrics may also be used. To determine the size of the ROI the computer may count the number of pixels which make up the ROI. To determine the shape of the ROI the computer may use any one of a variety of different techniques, for example a template based matching method may be used, and/or the ratio of (1) the area of the ROI to (2) the square of the length of its boundary may be used to obtain information about the circularity of the ROI. Template based matching methods may comprise the computer applying a series of convolution kernels to the ROI, each having a different shape. In these cases, the shape of the ROI may be determined by identifying the convolution kernel which produces the output having the greatest total intensity. Other methods of identifying the shape of the ROI may be used.

The computer then obtains a set of (or sets of) comparator data values from the computer memory. For example the computer may use the descriptor data to retrieve, from its memory, comparator data associated with structures known or expected to be found in the tissue type from which the image data was obtained. For example if the descriptor indicates breast tissue, the computer may obtain comparator data associated with structures found in breast tissue, such as glands. It will be appreciated in the context of the present disclosure that glands only represents one type of structure, and their use here is merely an example. Similar processes may be carried out for nuclei, stroma, vessels, lumen, muscle and other structures.

The values of the quantitative image metrics (e.g. size, shape, density etc.) for the selected ROI are then compared 1212 with the comparator data. If the measured values of those metrics for that ROI match (e.g. to within a specified tolerance) the comparator data for a type of structure then that ROI is classified as being that type of structure. The computer labels 1214 the image pixels of that ROI as belonging to that type of structure.

In the event that the ROI does not match the comparator data, it is classified as an unresolved ROI. The computer then selects 1216 an operation to be applied to the unresolved ROI. The operation that is to be applied may be selected based on the characteristics of that ROI. The selected operation is then applied 1218 to the unresolved ROI obtain a modified ROI. For example, if the ROI is larger than a certain size then an erosion operation is applied to modify that ROI. This has the effect of modifying the transform provided by the initial thresholding operation, at least in so far as it relates to that ROI. Other ways of modifying the transform applied to the unresolved ROI may also be used.

The computer then attempts again to classify 1210 this newly modified ROI by calculating, for this modified ROI at least one of the following quantitative image metrics:
the size of the modified ROI,
the shape of the modified ROI,
the optical density of the modified ROI,
the boundary of the modified ROI, and
whether the modified ROI includes any identifiable sub-ROI components.

As noted above, the boundaries may be treated as explained above. In addition, other image metrics may also be used. The data values obtained from these metrics in the modified ROI are then compared again against the comparator data. If the measured values of those metrics for that modified ROI match (e.g. to within a specified tolerance) the comparator data for a type of structure then that modified ROI is classified as being that type of structure. The computer labels 1214 the image pixels of that modified ROI as belonging to that type of structure.

In the event that the modified unresolved ROI also does not match the comparator data, the computer may determine 1220 whether to treat it as a partial structure. This may be done by identifying 1222 the image pixels in the original data which lie adjacent to (for example within a selected distance from a boundary of) the original unresolved ROI, and applying a revised threshold to those pixels. This may identify further suprathreshold groups of pixels around the ROI. The computer then merges 1226 these further suprathreshold regions with the original unresolved ROI (e.g. the ROI before the erosion operation described above) to create a merged ROI.

The computer then attempts again to classify 1210 this merged ROI by calculating, for this merged ROI at least one of the following quantitative image metrics:
the size of the modified ROI,
the shape of the modified ROI,
the optical density of the modified ROI,
the boundary of the modified ROI, and
whether the modified ROI includes any identifiable sub-ROI components.

As noted above, other image metrics may also be used. The data values obtained from these metrics in the modified ROI are then compared again against the comparator data. If the measured values of those metrics for that merged ROI match (e.g. to within a specified tolerance) the comparator data for a type of structure then that modified ROI is classified as being that type of structure. The computer labels the image pixels of that merged ROI as belonging to that type of structure.

Once all the ROIs have been labelled in this way, the resulting labelled pixel data can be used to provide a map of the tissue which identifies which regions of the tissue are associated with different types of structures.

It will be appreciated in the context of the present disclosure that this is just one sequence of operations which may be used to identify structures using methods such as those described with reference to FIG. 4. This embodiment has been described with reference to an image transformation which uses a thresholding operation, which may be based on thresholding the optical density data. Other kinds of transformation may also be used.

For example, the image transformation used in the embodiment of either FIG. 4 or FIG. 5 may comprise an intensity transformation. This may reduce variations in the image data in one or more spatial frequency bands, for example it may comprise a band-pass filtering for example a smoothing (low pass filter), or an edge enhancement (high pass filter). In these embodiments modifying the transformation when ROIs do not match the comparator data may comprise varying the pass-band of the filter, for example using a different spatial frequency cut off, for example using a wider smoothing kernel. The intensity transformation may be configured to reduce the number of intensity levels in the image data. For example, it may comprise setting all values below a certain threshold to a floor value, for example a background value (e.g. a constant reference value, such as zero). The intensity transformation may comprise a binary thresholding operation in which pixels below the threshold are set to a first value (e.g. a logical "FALSE" value, for example 0), and pixels above the threshold are set to a second value (e.g. a logical "TRUE", for example 1). In these embodiments modifying the transformation comprises varying the threshold. The intensity transformation may comprise a morphological filter adapted to enhance and suppress selected image structures based on at least one of their size and shape. It will be appreciated in the context of the present disclosure that a morphological filter comprises a structuring element of selected size and shape. In these embodiments modifying the transformation may comprise varying at least one of the size and shape of the structuring element. Types of morphological filters comprise erosion, dilation, opening, closing. Modifying the transform may also comprise keeping the structuring element constant and varying the type of morphological filter that is to be applied.

The image transformation may also comprise histogram equalization. Histogram equalization may provide a method for modifying the dynamic range and contrast of an image by altering that image such that its intensity histogram has a desired shape. Such a method may employ a mapping function such as a non-linear and non-monotonic transfer functions to map between pixel intensity values in the input and output images. Accordingly—the output image contains a modified distribution of intensities (for example a more uniform, e.g. a flat histogram). By doing so, the perceived level of detail may be increased, and therefore it may provide image data in which it may be easier to identify structures. In these cases modifying the transformation may comprise modifying the mapping function used to transform the image data.

Embodiments of the present disclosure may be applied to whole slide microscope images may have a resolution of a few hundred nanometers, for example 250 nm. The tissue samples themselves may each be ten millimeters across or more, for example about 15 mm by 15 mm Whole slide images of such samples may comprise at least $10^8$ pixels, for example at least $10^9$. In some embodiments whole slide images comprise $10^8$ to $10^{10}$ pixels.

To the extent that certain methods may be applied to the living human or animal body, it will be appreciated that such methods may not provide any surgical or therapeutic effect. In addition, it will be appreciated that such methods may be applied ex vivo, to tissue samples that are not part of the living human or animal body. For example, the methods described herein may be practiced on meat, tissue samples, cadavers, and other non-living objects. With reference to the drawings in general, it will be appreciated that schematic functional block diagrams are used to indicate functionality of systems and apparatus described herein. It will be appreciated however that the functionality need not be divided in this way, and should not be taken to imply an particular structure of hardware other than that described and claimed below. The function of one or more of the elements shown in the drawings may be further subdivided, and/or distributed throughout apparatus of the disclosure. In some embodiments the function of one or more elements shown in the drawings may be integrated into a single functional unit.

The above embodiments are to be understood as illustrative examples. Further embodiments are envisaged. It is to be understood that any feature described in relation to any one embodiment may be used alone, or in combination with other features described, and may also be used in combination with one or more features of any other of the embodiments, or any combination of any other of the embodiments. Furthermore, equivalents and modifications not described above may also be employed without departing from the scope of the invention, which is defined in the accompanying claims.

Other examples and variations are within the scope of the disclosure, as set out in the appended claims. For example, in an aspect there is provided computer implemented image processing method comprising: obtaining microscope image data defining a microscope slide image of a haematoxylin and eosin stained tissue sample, wherein the microscope slide image data comprises a plurality of image pixels; obtaining descriptor data indicating a type of tissue from which the tissue sample originates; selecting, based on the descriptor data, an image operation configured to transform the image data; applying the selected image operation to the image data to identify a number of discrete spatial regions of the image; selecting, from a data store, a set of quantitative image metrics wherein the quantitative image metrics are selected based on the descriptor data, determining, for each discrete spatial region, a sample region data value for each of the set of quantitative image metrics based on the subset of image data associated with the or each discrete spatial region, using the descriptor data to select, from the data store, at least one comparator set of tissue model data values, wherein each comparator set is associated with a different corresponding comparator tissue structure and each comparator set comprises data values of the set of quantitative image metrics for the corresponding comparator tissue structure; comparing the sample region data value for each discrete region with the at least one comparator set; and in the event that the sample region data value for the or each discrete spatial region matches the comparator set providing a map of the image data indicating that the discrete spatial region comprises the matching comparator tissue structure.

The image operation comprises a thresholding operation configured to provide a two-state map of the image. The boundary of such as two state region may be treated as explained herein above with reference to the treatment of boundaries between tumour and non-tumour regions. The discrete spatial regions may comprise contiguous groups of pixels belonging to a first one of the two-states of the two state map, for example wherein the contiguous groups of pixels comprise suprathreshold pixels. The quantitative image metrics may comprise at least one of: the size of the discrete spatial region (ROI), the shape of the discrete spatial region (ROI), the optical density of the discrete spatial region (ROI), the boundary of the discrete spatial region (ROI), and whether the discrete spatial region (ROI) includes any identifiable sub-ROI components.

In an embodiment, in the event that a discrete spatial region (ROI) does not match the comparator data, it is classified as an unresolved ROI, and a further image operation is applied to the unresolved ROI to provide a modified ROI. The further image operation may comprise a morphological filter such as at least one of an erosion, a dilation, and an opening. The method may comprise calculating, for the modified ROI at least one quantitative image metric selected from the list comprising: the size of the ROI, the shape of the ROI, the optical density of the ROI, the boundary of the ROI, and whether the ROI includes any identifiable sub-ROI components.

Embodiments of this method comprise comparing the values of the at least one quantitative image metric for the modified ROI with comparator data for identifying the modified ROI. In some embodiments, in the event that the value(s) of the at least one quantitative image metric for the modified ROI do not match the comparator data for identifying the modified ROI, the method comprises obtaining a second modified ROI by applying a second further image operation to at least one of: (a) the unresolved ROI and (b) the modified ROI. Such methods may also comprise calculating, for the second modified ROI at least one quantitative image metric selected from the list comprising: the size of the ROI, the shape of the ROI, the optical density of the ROI, the boundary of the ROI, and whether the ROI includes any identifiable sub-ROI components, and comparing the values of the at least one quantitative image metric for the second modified ROI with comparator data for identifying the second modified ROI. In an embodiment, in the event that the second modified ROI does not match the comparator data for identifying the second modified ROI, the method comprises iteratively repeating:

(i) the application of a further image operator to obtain a further modified ROI
(ii) calculating the at least one quantitative image metric; and
(iii) comparing the values of the at least one quantitative image metric for that further modified ROI with comparator data for identifying the further modified ROI.

In some embodiments the image operation comprises spatial filter configured to identify structured image data that describes structures having a spatial length scale in a selected range. The spatial filter comprises a morphological filter having a structuring element selected based on the descriptor data, for example at least one of the size and shape of the structuring element are selected based on the descriptor data.

In some embodiments the set of quantitative image metrics comprise a metric based on optical density in the or each discrete region. In some embodiments, the set of quantitative image metrics comprise a metric based on spatial frequency data in a selected range of spatial frequencies in the or each discrete region. In some embodiments, the quantitative image metrics comprise a metric based on texture data in the or each discrete region.

An aspect of the disclosure also provides a computer implemented microscopy method for identifying structures, the method comprising: obtaining first image data from a digital microscope image; applying an image transformation to the first image data to obtain second image data, wherein at least some pixel data values of the second image data are different from corresponding pixel data values of the first image data; comparing the second image data with at least one comparator, and classifying structures in the microscope image based on the comparing; identifying at least one unclassified structure in the second image data; modifying the image transformation; applying the modified image transformation to the image data obtained from the digital microscope image to obtain third image data, and comparing the third image data with the at least one comparator for identifying the at least one unclassified structure.

A related aspect provides a computer implemented microscopy method for identifying structures, the method comprising: obtaining first image data from a digital microscope image; applying an image transformation to the first image data to obtain second image data, wherein at least some pixel values of the second image data are different from corresponding pixel values of the first image data; comparing the second image data with at least one comparator, and classifying structures in the microscope image based on the comparing.

The image transformation may comprises a contrast stretching operation, in which case the method comprises: modifying the contrast stretching operation; applying the modified contrast stretching operation to the image data obtained from the digital microscope image to obtain third intensity data, and comparing the third intensity data with the at least one comparator for identifying at least one unclassified structure.

The image transformation may comprise an operation configured to attenuate or enhance one or more selected spatial frequency bands in the image data to which the image transformation is applied. Modifying the image transformation may comprise modifying the attenuation or enhancement of one or more of the one or more spatial frequency bands. These and related methods may comprise selecting the image transformation based on at least one of: (a) at least one quantitative image metric of the image data; and (b) descriptor data indicating the type of tissue from which the microscope image originates.

The image transformation may comprise an intensity transformation adapted to modify the intensity of at least one colour channel of the image data to which it is applied. For example, the image transformation may comprise a histogram equalization. Histogram equalisation may comprise applying a mapping function to the intensity of at least one colour channel of the image data to which it is applied, in such embodiments modifying the image transformation comprises modifying the mapping function.

As noted above, the image transformation may comprise a contrast stretching operation.

The contrast stretching operation may comprise applying a linear scaling to the intensity of at least one colour channel of the image data to which it is applied. Accordingly, modifying the image transformation may comprise modifying the linear scaling.

The modified image transformation may applied to a subset of the image data comprising at least one unclassified structure. For example it may be applied to individual pixels, or groups of pixels which make up the image to provide modified pixel image data.

The modified image transformation may applied to a subset of the image data which excludes at least one classified structure. These and related methods may comprise iteratively repeating the modifying, comparing and classifying steps until less than a selected number of objects remain unclassified.

In an aspect there is provided a computer implemented image processing method of identifying a tissue boundary of a tumour region of a tissue sample, the tissue sample containing non-tumour regions and at least one tumour region, to enable excision of at least a portion of a tumour region from the tissue sample by cutting along the tissue boundary, the method comprising: obtaining an image of a tissue section of the tissue sample; identifying at least one image property of the image; comparing the image property with classification data; based on the comparison, classifying a region of the image as a tumour region representing a tumour region in the tissue sample or a non-tumour region representing a non-tumour region in the tissue sample; and if the region of the image is classified as a tumour region, identifying a boundary of the region of the image; and using the boundary to identify a tissue boundary of the tumour region of the tissue sample represented by the region of the image.

In an embodiment the at least one image property comprises one or any combination of image properties from the group comprising: a statistical moment, a moment invariant feature, a features derived from a grey level co-occurrence matrix, a spectral feature or a morphological feature.

In an embodiment the at least one image property comprises at least one image property of each of a plurality of different colour components of the image concatenated together to provide a feature vector.

In an embodiment the method comprises classifying the region of the image based on a comparison between the feature vector and the classification data.

In an embodiment the classification data comprises a subset of data sets selected from a set of first model image data sets indicative of tumour tissue and from a set of second model image data sets indicative of non-tumour tissue.

In an embodiment the step of identifying a boundary of the region of the image comprises: generating a two-state map of the image by representing regions classified as tumour regions using a first state and by representing regions classified as non-tumour regions using a second state.

In an embodiment the method comprises applying a smoothing algorithm to the boundary to provide a smoothed template for cutting along the tissue boundary.

In an embodiment applying the smoothing algorithm comprises applying a forward frequency-domain transform and an inverse frequency-domain transform.

In an embodiment applying the smoothing algorithm comprises representing the image boundary as a sequence of transition indicators indicating the direction of a transition between pixels on the image boundary, and smoothing the sequence of transition indicators.

In an embodiment the method comprises displaying the two-state map combined with a probability data map indicating the probability that regions of the sample comprise tumour.

In an embodiment the method comprises updating the classification data using a supervised learning method.

In an embodiment the method comprises determining whether the sample comprises tumour tissue, and only identifying the boundary in the event that it is determined that the sample comprises tumour.

In an aspect there is provided a computer implemented image processing method of identifying a tissue boundary of a tumour region of a tissue sample, the tissue sample containing non-tumour regions and at least one tumour region, to enable excision of at least a portion of a tumour region from the tissue sample by cutting along the tissue boundary, the method comprising: identifying a background region in the image and removing the background region from the image using a thresholding method; dividing the image into tiles, and for each tile of at least a subset of the tiles:

providing data representing a plurality of colour components of the tile, wherein a first of the colour component corresponds to a first indicator used to stain the tissue section, a second of the colour component corresponds to a second indicator used to stain the tissue section and a third of the colour component is a greyscale colour component;

identifying an image property of each of the colour components and concatenating the image properties to generate a feature vector;

comparing the feature vector with binary classification data, the binary classification data a set of first model image data sets indicative of tumour tissue and a set of second model image data sets indicative of non-tumour tissue;

based on the comparison, classifying the feature vector as corresponding to tumour tissue or non-tumour tissue;

based on having classified the feature vector of at least one tile as representing tumour tissue, classifying a region of the image as representing a tumour region;

providing a binary colour map of the image by representing regions classified as tumour regions in a first colour and regions classified as classified non-tumour regions in a second colour;

identifying a boundary of a first colour region in the binary colour map;

smoothing the boundary by applying a smoothing algorithm to provide a smoothed template for cutting along the corresponding tissue boundary; and scaling the relative colour intensity of first colour regions according to a probability of their correspondence with a tumour region of the tissue sample respectively.

In an embodiment the methods comprise cutting along the tissue boundary, wherein the step of cutting along the tissue boundary comprises cutting along a tissue boundary in the tissue section or cutting along a tissue boundary in a subsequent tissue section of the tissue sample.

In an aspect there is provided a macrodissection apparatus, comprising: a receiver for receiving data representing a boundary in the image; and a controller for guiding a cutting of the tissue sample along a path based on the data representing the boundary.

In an aspect there is provided an image server, accessible to a plurality of users, configured to; receive, from any of the plurality of users, image data of a tissue section of a tissue sample containing tumour and non-tumour regions;

access classification data for classifying regions of the image as tumour regions or non-tumour regions;

implement a method to identify a boundary in the image; and make data representing the boundary available to at least one of the plurality of users.

In an embodiment the classification data comprises an association between stored feature vectors and a tumour tissue class, and a non-tumour tissue class. In an embodiment the feature vectors each comprise at least one image property derived from at least one of a plurality of colour components of the image. In an embodiment the image server is configured to update the classification data based on the received data and feedback from the user.

In an aspect there is provided an apparatus for guiding in vitro dissection of a tissue sample, the apparatus comprising: a processor configured to obtain an image of a tissue section of the tissue sample, to identify at least one image property of the image, to compare the image property with classification data, and, based on the comparison, to determine whether a region of the sample comprises tumour;

wherein the processor is configured so, in the event that the sample comprises tumour, the processor identifies a boundary of the tumour region of the image; and provides the image boundary to guide dissection of tumour from the sample.

In an embodiment the apparatus comprises a display for displaying the boundary as a template to guide dissection of the sample. The apparatus may be configured to perform any of the methods described herein.

Apparatus features described herein may be provided as method features, and vice versa.

It should also be appreciated that particular combinations of the various features described and defined in any aspects of the invention can be implemented and/or supplied and/or used independently.

In some examples, one or more memory elements can store data and/or program instructions used to implement the operations described herein. Embodiments of the disclosure provide tangible, non-transitory storage media comprising program instructions operable to program a processor to perform any one or more of the methods described and/or claimed herein and/or to provide data processing apparatus as described and/or claimed herein.

The activities and apparatus outlined herein may be implemented with fixed logic such as assemblies of logic gates or programmable logic such as software and/or computer program instructions executed by a processor. Other kinds of programmable logic include programmable processors, programmable digital logic (e.g., a field programmable gate array (FPGA), an erasable programmable read only memory (EPROM), an electrically erasable programmable read only memory (EEPROM)), an application specific integrated circuit, ASIC, or any other kind of digital logic, software code, electronic instructions, flash memory, optical disks, CD-ROMs, DVD ROMs, magnetic or optical cards, other types of machine-readable mediums suitable for storing electronic instructions, or any suitable combination thereof.

The invention claimed is:

1. A method performed by a computing system comprising a processor and a memory, for identifying tissue structures in a microscope image of a tissue sample, the method comprising:

preparing a histology slide comprising a tissue sample, including staining the tissue sample with haematoxylin and eosin;

receiving digitized microscope image data from a microscope defining a microscope slide image of the haematoxylin and eosin stained tissue sample, wherein the digitized microscope slide image data comprises a plurality of image pixels;

receiving digitized descriptor data indicating a type of tissue from which the tissue sample originates, the descriptor data comprising a machine-readable identifier of tissue type;

using the descriptor data, selecting from data stored in the computer memory an image operation configured to transform the digitized image data;

transforming the digitized image data, using the selected image operation to obtain a transformed image and identifying a number of discrete spatial regions of the digitized image, wherein said transformed image can be obtained by intensity transformation, morphological transformation or histogram equalization;

selecting, from data stored in the computer memory, a set of quantitative image metrics based on the descriptor data, computing, for each identified discrete spatial region, a sample region data value for each of the set of quantitative image metrics based on the subset of image data associated with each discrete spatial region, using the descriptor data, selecting from data stored in the computer memory, at least one comparator set comprising tissue model data values, wherein each comparator set is associated with a different tissue structure, and each comparator set comprises data values of a set of quantitative image metrics for the associated tissue structure;

comparing the sample region data value for each discrete spatial region with the at least one comparator set; and where the sample region data value for each discrete spatial region matches the comparator set, providing a map of the image data indicating that the discrete spatial region comprises the matching comparator tissue structure.

2. The method of claim 1 wherein the image operation comprises a thresholding operation configured to provide a two-state map of the image.

3. The method of claim 2 wherein the discrete spatial regions comprise contiguous groups of pixels belonging to a first one of the two states of the two-state map.

4. The method of claim 3 wherein the contiguous groups of pixels comprise suprathreshold pixels, and the method comprises iterating over pixels of the image data to identify whether nearest neighbours of each pixel belong to one of said contiguous groups.

5. The method of claim 1 wherein the quantitative image metrics comprise at least one of: the size of the discrete spatial region (ROI), the shape of the discrete spatial region (ROI), the optical density of the discrete spatial region (ROI), the boundary of the discrete spatial region (ROI), and whether the discrete spatial region (ROI) includes any identifiable sub-ROI components.

6. The method of claim 5 wherein if a discrete spatial region (ROI) does not match the comparator data, it is classified as an unresolved ROI, and a further image operation is applied to the unresolved ROI to provide a modified ROI.

7. The method of claim 6 in which the further image operation comprises at least one of an erosion, a dilation, and an opening.

8. The method of claim 6 comprising calculating, for the modified ROI at least one quantitative image metric selected from the list comprising: the size of the ROI, the shape of the ROI, the optical density of the ROI, the boundary of the ROI, and whether the ROI includes any identifiable sub-ROI components.

9. The method of claim 8 comprising comparing the values of the at least one quantitative image metric for the modified ROI with comparator data for identifying the modified ROI.

10. The method of claim 9 wherein the method further comprises obtaining a second modified ROI by applying a second further image operation to at least one of: (a) the unresolved ROI and (b) the modified ROI, when the value(s) of the at least one quantitative image metric for the modified ROI do not match the comparator data for identifying the modified ROI.

11. The method of claim 10, further comprising calculating, for the second modified ROI at least one quantitative image metric selected from the list comprising: the size of the ROI, the shape of the ROI, the optical density of the ROI, the boundary of the ROI, and whether the ROI includes any identifiable sub-ROI components, and comparing the values of the at least one quantitative image metric for the second modified ROI with comparator data for identifying the second modified ROI.

* * * * *